United States Patent
Takada et al.

(10) Patent No.: US 7,998,609 B2
(45) Date of Patent: Aug. 16, 2011

(54) SECONDARY CELL REPLACING METHOD

(75) Inventors: Masahiro Takada, Shizuoka-ken (JP); Yoshiyuki Nakamura, Toyota (JP); Koji Otsubo, Kyoto (JP); Kazuo Tojima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/615,095

(22) Filed: Nov. 9, 2009

(65) Prior Publication Data

US 2010/0052616 A1    Mar. 4, 2010

Related U.S. Application Data

(63) Continuation of application No. 10/448,389, filed on May 30, 2003, now abandoned.

(30) Foreign Application Priority Data

May 30, 2002    (JP) ................................. 2002-157768

(51) Int. Cl.
*H01M 10/48* (2006.01)
*H02J 7/00* (2006.01)

(52) U.S. Cl. ............ 429/91; 429/90; 320/127; 320/128; 320/129; 320/130; 320/131; 320/132; 320/134

(58) Field of Classification Search .................. None
See application file for complete search history.

(56) References Cited

U.S. PATENT DOCUMENTS

| 5,920,180 | A | 7/1999 | Kim | |
|---|---|---|---|---|
| RE37,678 | E * | 4/2002 | Ikawa et al. | 320/136 |
| 2001/0035737 | A1* | 11/2001 | Nakanishi et al. | 320/122 |
| 2003/0117109 | A1* | 6/2003 | Trepka | 320/126 |

FOREIGN PATENT DOCUMENTS

| JP | 2-101937 A | 4/1990 |
|---|---|---|
| JP | 11-317243 A | 11/1999 |
| JP | 2002-15781 A | 1/2002 |

* cited by examiner

*Primary Examiner* — Cynthia Lee
(74) *Attorney, Agent, or Firm* — Kenyon & Kenyon LLP

(57) ABSTRACT

In a pre-replacement process, a replacement battery module is provided with a memory effect before being dispatched, by performing at least one of the process of performing a cyclic charge/discharge operation on the replacement battery module while limiting the width of SOC change to an intermediate range, and the process of setting an initial SOC and then letting the replacement battery module stand for a predetermined time in an environment of temperature above normal temperature. This pre-replacement process substantially eliminates the difference between the voltage characteristic of the replacement battery module yet to be used and the voltage characteristic of a battery module having a history of use, thereby achieving a uniform voltage characteristic of a battery pack as a whole.

14 Claims, 6 Drawing Sheets

F I G . 7
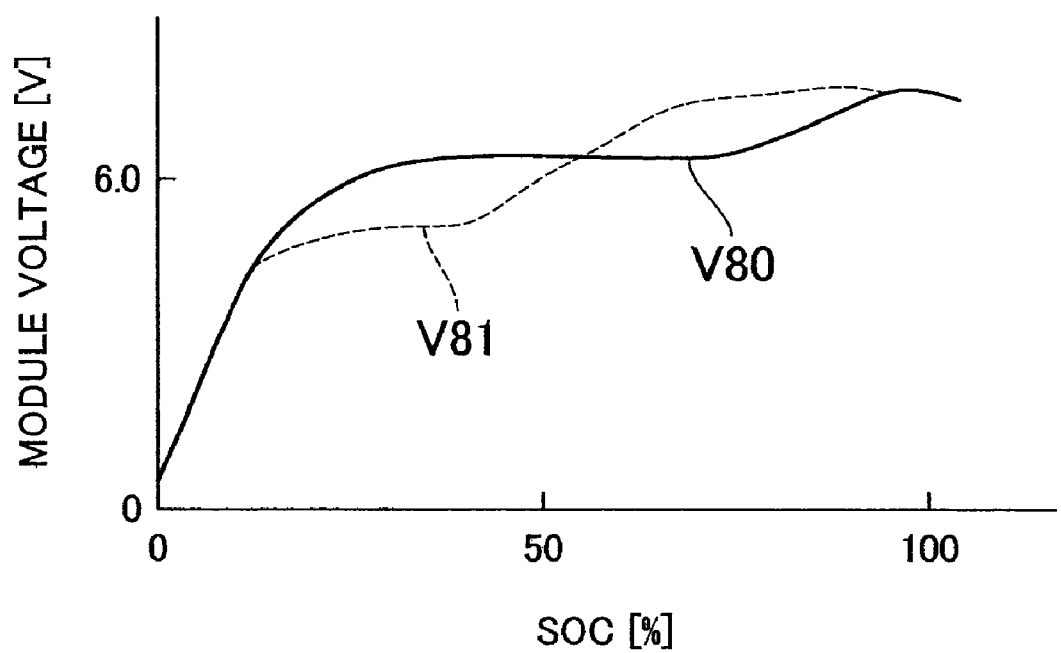

SECONDARY CELL REPLACING METHOD

INCORPORATION BY REFERENCE

This is a continuation of application Ser. No. 10/448,389 filed 30 May 2003, the contents of which are incorporated hereby by reference. The disclosure of Japanese Patent Application No. 2002-157768 filed on May 30, 2002 including the specification, drawings and abstract is incorporated herein by reference in its entirety.

BACKGROUND OF THE INVENTION

1. Field of the Invention

The invention relates to a method for replacing a secondary cell in a case where one or more secondary cells of a battery pack formed by electrically connecting a plurality of secondary cells in series or parallel have deteriorated, or have come to an end of service life, or have failed. The invention particularly relates to a method for replacing a secondary cell installed in an electric vehicle (PEV) or a hybrid vehicle (HEV).

2. Description of the Related Art

Recently, many electric vehicles (PEVs) and hybrid vehicles (HEVs) having both an electric motor and an internal combustion engine employ nickel-hydrogen (Ni-MH) secondary cells as a major electric power supply for driving an electric motor, for the high energy density (i.e., compact storage of energy) and the high output density of the nickel-hydrogen (Ni-MH) secondary cells. In order to supply sufficient power to an electric motor, such PEVs and HEVs adopt a battery pack formed by combining a plurality of monoblock type battery modules in which a plurality of unit cells are internally connected.

With regard to such Ni-MH secondary cells installed in PEVs and HEVs in the form of a plurality of connected battery modules, a long service life is possible if the environment of use is appropriate. In most cases, however, the battery modules individually come to have an abnormality or reach an end of service life one at a time due to individual differences of secondary cells or defects in component parts of secondary cells. The battery module that has been judged as an abnormal module or has come to an end of life is replaced with a new battery module, and the thus-refitted battery pack is used.

However, in the case where a battery module that has been judged abnormal or has come to an end of life is removed from a battery pack made up of a plurality of battery modules and a new battery module is incorporated, problems as stated below occur due to characteristic differences between the battery module newly incorporated (hereinafter, referred to as "new battery module") and a battery module that has been and is still in use in the battery pack (hereinafter, referred to as "old battery module").

(1) As indicated in FIG. 5, during a vehicle run, the voltage difference ($\Delta V$) between the voltage value (V$60$) of the new battery module and the voltage value (V$61$) of an old battery module may become large, so that an electronic control unit of the battery (hereinafter, referred to as "battery ECU") may possibly make a false detection of a "voltage dispersion abnormality" to protect the battery.

(2) As indicated in FIG. 6, as the remaining amount of charge (SOC: state of charge) of each battery module is computed, the difference ($\Delta$SOC) between the SOC value (SOC$70$) of the new battery module and the SOC value (SOC$71$) of an old battery module may become large, so that the battery ECU may possibly make a false detection of an "SOC dispersion abnormality" to protect the battery.

The above-stated problems are caused as follows. That is, an old battery module, having a history of use, has stored a memory effect. Therefore, as indicated in FIG. 7, the old battery module has a voltage characteristic (V$81$) that does not coincide with the voltage characteristic (V$80$) of a new battery module incorporated at the time of replacement.

SUMMARY OF THE INVENTION

The invention has been accomplished in view of the aforementioned circumstances. It is an object of the invention to provide a secondary cell replacing method that allows replacement of cells at lost costs, and that allows maximum performance of a battery pack as a whole without false abnormality detection.

In order to achieve the aforementioned object, a secondary cell replacing method in accordance with an aspect of the invention, includes the steps of: preparing a replacement cell provided beforehand with a memory effect; and replacing a secondary cell of a battery pack formed by electrically connecting a plurality of secondary cells in series or parallel, with the replacement cell.

According to this method, the replacement of a to-be-replaced secondary cell in a battery pack with a new replacement secondary cell provided with a memory effect will eliminate the difference between the voltage characteristic of the secondary cell yet to be used and the voltage characteristic of a secondary cell having a history of use, thereby achieving a uniform voltage characteristic of the battery pack as a whole. Therefore, if a battery pack in which secondary cells have been replaced in the above-described manner is installed in a vehicle, there will be no false abnormality detection, and the battery pack will be able to deliver full performance as a whole.

In this method, it is possible to adopt a construction in which only if a cell characteristic of the to-be-replaced cell reclaimed fails to meet a predetermined reference after a predetermined process performed on the to-be-replaced cell, the to-be-replaced cell is replaced by the replacement cell provided beforehand with a memory effect. In this case, if a cell characteristic of the to-be-replaced cell reclaimed meets a predetermined reference after a predetermined process performed on the to-be-replaced cell, the secondary cell may be incorporated into a battery pack, and the battery pack is then provided for use.

The to-be-replaced cells include cells identified as faulty and abnormal cells, and cells that can be made usable again by restoring a cell characteristic. If such reusable secondary cells are assembled or incorporated into battery packs and the battery packs are dispatched as substantially new packs, the price of battery packs for replacement can be reduced and the waste of battery packs and cells can be considerably reduced.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 7 is a graph indicating voltage characteristics of a new battery module and an old battery module according to a related-art technology.

DETAILED DESCRIPTION OF THE PREFERRED EMBODIMENTS

The "secondary cell" in the invention means each one of the unit cells assembled as a battery pack, or a mono-block type battery module in which a plurality of unit cells are internally connected. The "secondary cell" in the invention include not only the secondary cells in a battery pack in which a plurality of secondary cells are electrically connected in series or parallel, but also the secondary cells in a battery pack system formed by combining battery packs in series or parallel.

An embodiment of the invention will be described in conjunction with an Ni-MH secondary cell as an example of an alkali secondary cell. Presented as an example of the Ni-MH secondary cell in this embodiment is a battery (hereinafter, referred to as "battery module") in which a battery jar assembly is formed by integrally connecting six rectangular parallelepiped-shaped battery jars at their short-side surfaces, and in which an upper surface opening of each battery jar is closed integrally with a lid, and unit cells adjacent to each other at upper end portions of the adjacent short-side surfaces of the battery jars are internally connected.

A preferred embodiment of the invention will be described hereinafter with reference to the accompanying drawings.

Figure 1:
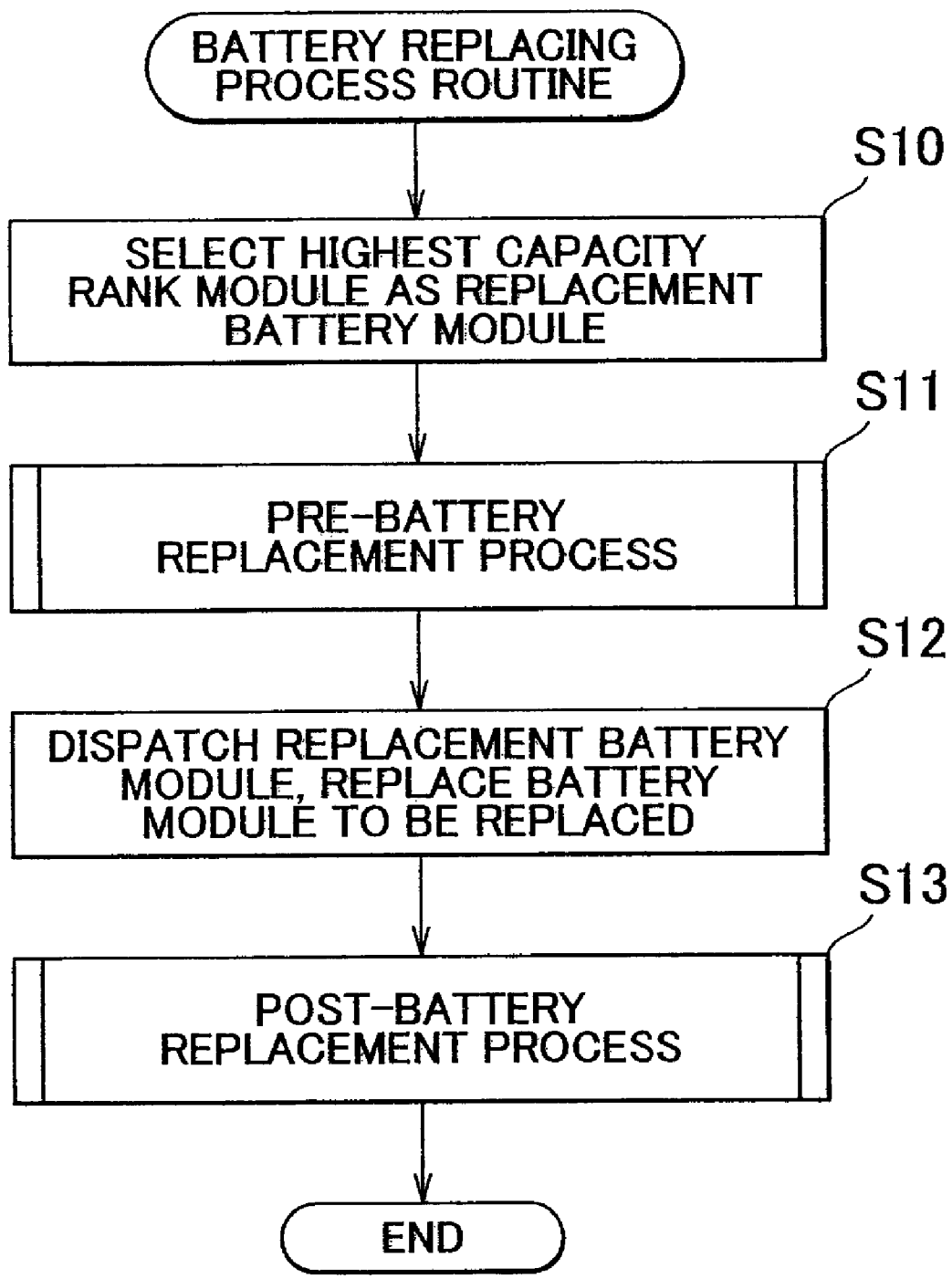
FIG. 1 is a flowchart illustrating a secondary cell replacing process routine in accordance with an embodiment of the invention.

FIG. 1 is a flowchart illustrating a secondary cell replacing process routine in accordance with an embodiment of the invention.

Referring to FIG. 1, first, among the battery modules stored after being transported in cold storage, a battery module that has a greater capacity rank than any one of the battery modules of the battery pack in use excluding a module to be replaced, that is, a battery module that will have the highest capacity rank when incorporated into the battery pack, is selected as a replacement battery module (S10). Subsequently, the replacement battery module thus selected is subjected to a process prior to battery replacement (S11). In the pre-battery replacement process S11, the replacement battery module is provided with a memory effect before being dispatched or shipped. As a memory effect imparting process, it is preferable to, for example, conduct a cyclic charge/discharge operation. It is particularly preferable that the cyclic charge/discharge operation be conducted while the width of change in the remaining amount of charge (SOC) of the secondary battery is limited within an intermediate range of the battery capacity. In this case, a preferable intermediate range is 20% to 80%. The cyclic charge/discharge operation is performed, for example, to a number of cycles of 5 to 100, with the charge/discharge rate being set at 0.2 C to 10 C (preferably, 2 C to 5 C), and with the battery temperature being set at 25° C. to 30° C. A reason for limiting the width of SOC change to the range of 20% to 80% is that if the width of SOC change is greater than this range, the charge/discharge operation approaches a full charge and a complete discharge so that a memory effect cannot be imparted to the secondary battery.

Another preferable technique for imparting a memory effect to a secondary battery is to set the initial amount of charge remaining in a secondary battery at 40% or higher and then let the secondary battery stand for at least two weeks while keeping the battery temperature above normal temperature.

In view of imparting a memory effect to a secondary battery, it is preferable that the initial amount of charge remaining in the secondary battery be in the range of 40% to 90%, which is higher than a moderate level, and that the storage temperature be in the range of 25° C. to 55° C., at which the self discharge is greater than at normal temperature, and that the storage duration be as long as 2 to 12 weeks provided that the SOC remains above 20% despite self discharge.

Figure 2:
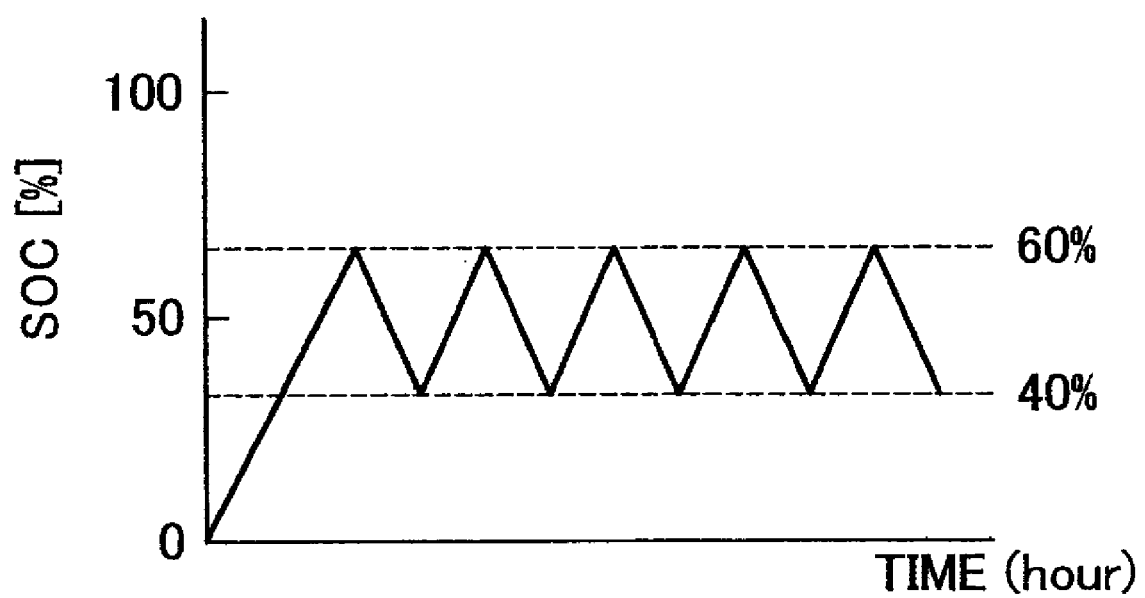
FIG. 2 is a diagram indicating a width of changes in SOC during charge/discharge cycles.

More specifically, the replacement battery module is provided with a memory effect by performing at least one of the following processes. In one process, the width of change in SOC is limited to the range of 40% to 60% as indicated in FIG. 2, taking into consideration a history of use of a battery that the battery has been constantly used within an intermediate range of the amount of remaining charge as in the case of an HEV. Then, 30 cycles of charge/discharge operations are conducted at a charge/discharge rate of 2 C (e.g., an electric current value of 13 A in the case of a battery module having a battery capacity of 6.5 Ah) while the battery temperature is kept at 25° C. to 30° C. Alternatively, after the initial SOC of the replacement battery module is set at 70%, the battery module is left standing for 4 weeks with the battery temperature being kept at 45° C.

The impartment of a memory effect achieves agreement between the voltage characteristic of the replacement battery module yet to be used and the voltage characteristic of the battery module having a history of use. Therefore, as the replacement battery module in which the new secondary cells are provided with a memory effect substantially identical to the memory effect accumulated in the secondary cells that have been in use up to the present time is incorporated into the battery pack, there is substantially no difference between the voltage characteristic of the secondary cells having a history of use and the voltage characteristic of the secondary cells about to be used, so that a uniform voltage characteristic of the battery pack as a whole can be obtained.

The replacement of a battery module includes not only the replacement of a battery module judged faulty, but also a case where in a periodical replacement operation conducted after replacement of a faulty battery module, only the battery modules that were not replaced before are replaced, as well as a case where if a battery pack is known to have deterioration variations among the battery modules, battery modules that are likely to deteriorate are replaced on a periodical basis.

Figure 3:
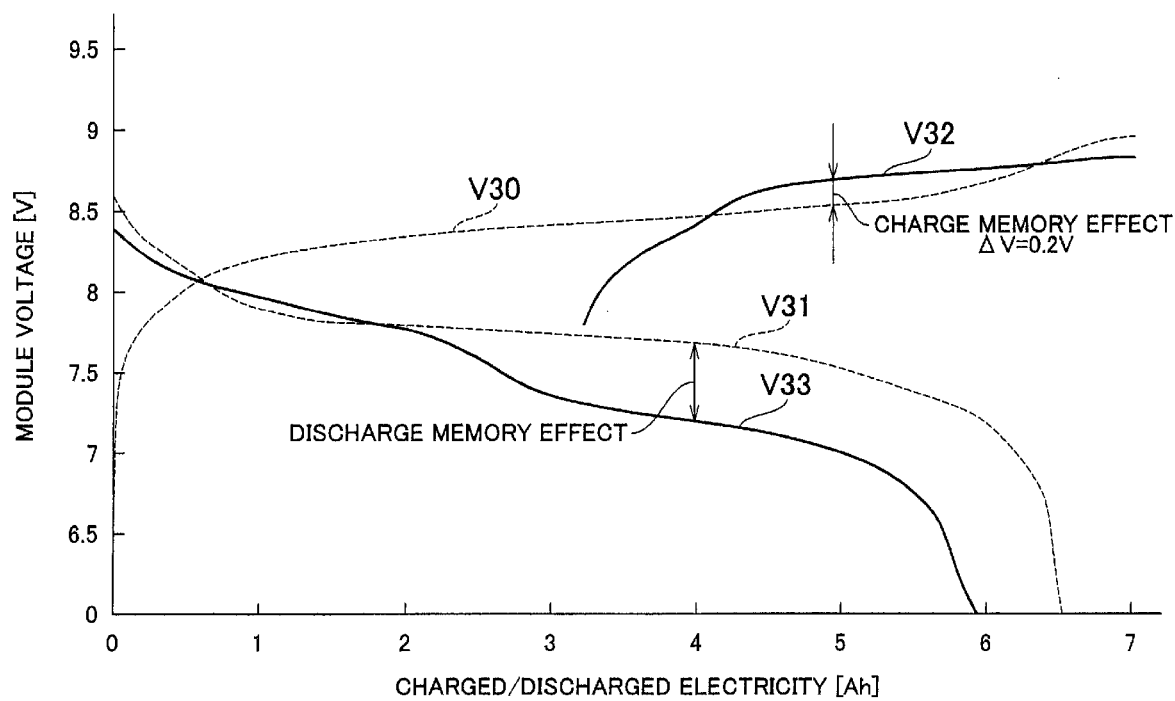
FIG. 3 is a graph indicating the charge-time and discharge-time voltage characteristics of a new battery module, where the new battery module is subjected to charge/discharge cycles.

FIG. 3 is a graph indicating the charge-time and discharge-time voltage characteristics of a new battery module having six internally connected unit cells, where the new battery module is subjected to charge/discharge cycles. In FIG. 3, V30 and V31 indicate the module voltages at the time of charge and the time of discharge, respectively, in the third cycle from the beginning, and V32 and V33 indicate the module voltages at the time of charge and the time of discharge, respectively, after 500 cycles. As indicated in FIG. 3, the charge/discharge cycles cause a charge memory effect and a discharge memory effect.

Figure 4:
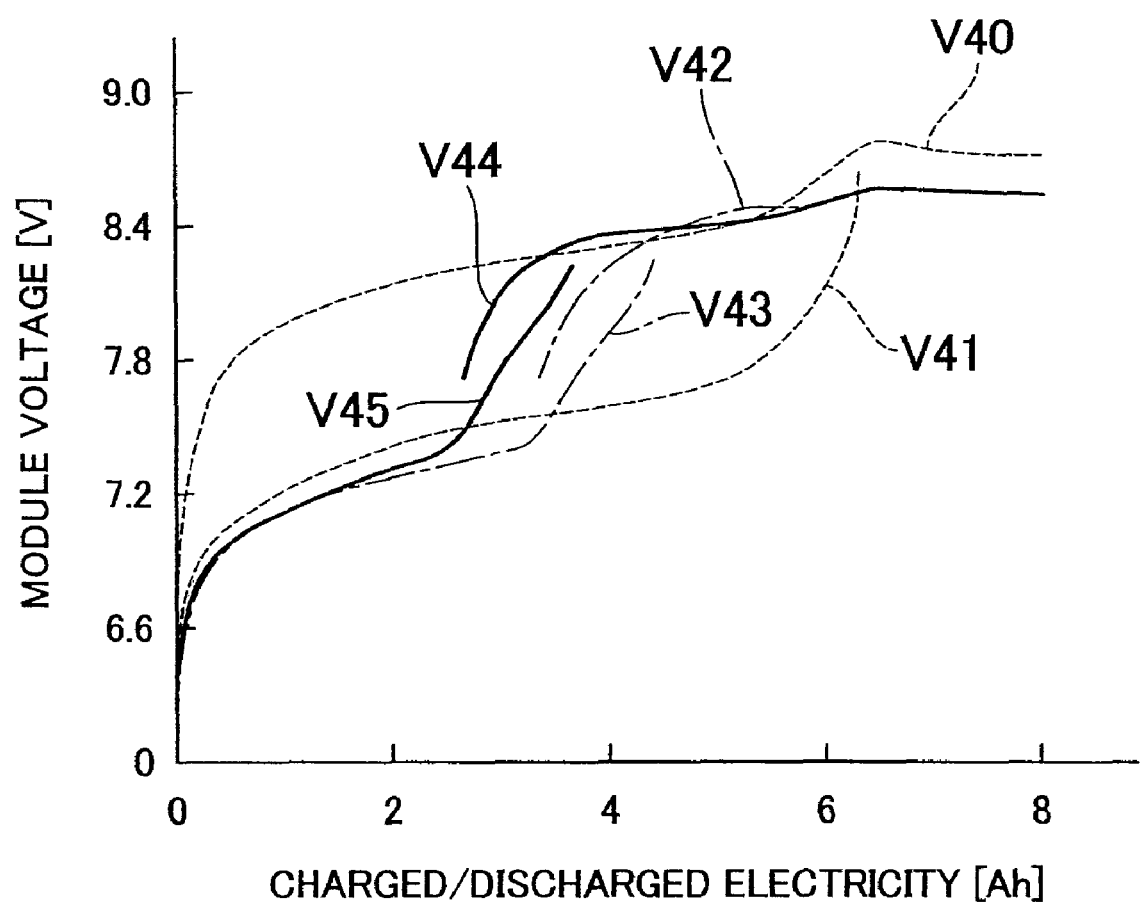
FIG. 4 is a graph indicating the charge-time and discharge-time voltage characteristics of a new battery module, where the battery module is subjected to the charge setting and the discharge setting, and is then left standing for 20 days in an environment of 40° C.
Figure 5:
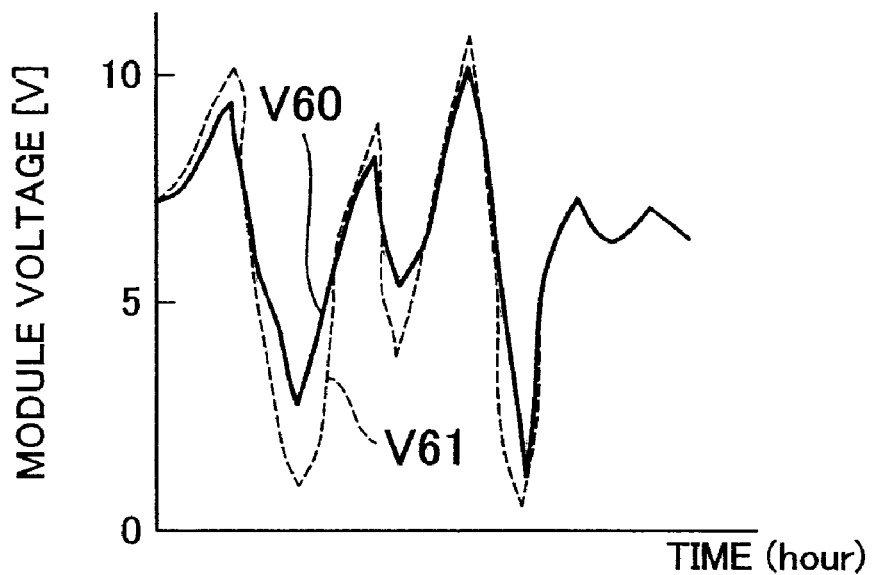
FIG. 5 is a graph indicating time-dependent module voltage changes of a new battery module and an old battery module according to a related-art technology.
Figure 6:
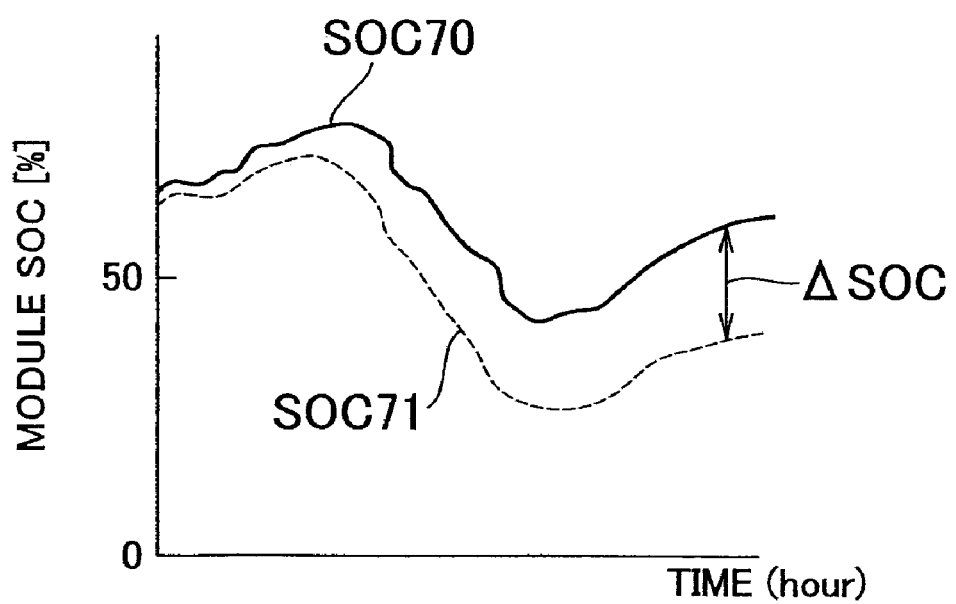
FIG. 6 is a graph indicating time-dependent module SOC changes of a new battery module and an old battery module according to a related-art technology.

FIG. 4 is a graph indicating the charge-time and discharge-time voltage characteristics of a new battery module having six internally connected unit cells, where the battery module is subjected to the charge setting and the discharge setting, and is then left standing for 20 days in an environment of 40° C. In FIG. 4, V40 and V41 indicate the module voltages at the time of charge and the time of discharge, respectively, before the battery module is left standing, and V42 and V43 indicate the module voltages at the time of charge and the time of discharge, respectively, after the battery module is subjected to the charge setting and then is left standing for 20 days, and V44 and V45 indicate the module voltages at the time of charge and the time of discharge, respectively, after the battery module is subjected to the discharge setting and then is left standing for 20 days. As indicated in FIG. 4, when the battery module has been left standing for some time, a charge memory effect and a discharge memory effect occur.

Referring back to FIG. 1, after being subjected to the pre-battery replacement process S11, the replacement battery module is dispatched to replace a to-be-replaced battery module (S 12). Subsequently, a post-battery replacement process is performed on the entire battery pack (S13). In the post-battery replacement process S13, the overcharging at or above 100% of the battery capacity is performed so as to equalize the amount of charge present in the new battery module and the amount of charge in the other battery modules, and to cancel or reduce the internal resistance value, which may have increased due to a long time of the replacement battery module being left standing. Thus, the entire battery pack is made able to deliver full performance.

The battery modules to be replaced include battery modules identified as faulty and abnormal modules, and battery modules that can be made usable again by restoring a battery characteristic. If such reusable battery modules replaced are assembled into a battery pack that is to be dispatched as a substantially new product, the price of battery packs for replacement can be reduced and the waste of battery packs and the like can be considerably reduced.

As is apparent from the foregoing description, the embodiment of the invention achieves good advantages. That is, the embodiment allows battery replacement at low costs, and allows maximum performance of a battery pack as a whole without false abnormality detection.

While the invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A method for replacing a secondary battery module within a secondary battery pack containing a plurality of secondary battery modules, which are electrically connected in series or parallel, and in each of which memory effect occurs, comprising:
   preparing a replacement secondary battery module;
   performing a cyclic charge/discharge operation so as to impart a memory effect to the replacement secondary battery module; and
   replacing the secondary battery module within the battery pack, with the replacement secondary cell to which the memory effect is imparted,
   wherein the cyclic charge/discharge operation is performed in such a manner that a width of a cyclic charge/discharge is within an intermediate range of a capacity of the replacement secondary module, and
   wherein the intermediate range is a range of 20% to 80% of the capacity of the replacement secondary module.

2. The method of claim 1, wherein the replacement battery module is a Ni-MH secondary cell.

3. The method according to claim 1, wherein the cyclic charge/discharge operation is performed to a number of cycles of 5 to 100.

4. The method of claim 3, wherein during said 5 to 100 cycles the amount of charge of the replacement battery module is maintained between 40% and 60% of the capacity of the replacement battery module.

5. The method according to claim 3, wherein the cyclic charge/discharge operation is performed with a charge/discharge rate of 2 to 5 C.

6. The method according to claim 3, wherein the cyclic charge/discharge operation is performed with the battery temperature being set at 25-30 degrees Celsius.

7. The method according to claim 1, further comprising overcharging the battery pack to at least 100% of a capacity of the battery pack after replacing one of the secondary cells of the battery pack with the replacement secondary cell.

8. A method for replacing a battery module within a battery pack containing a plurality of battery modules, comprising:
   selecting a replacement battery module;
   providing said replacement battery module with a memory effect; and
   replacing said battery module in said battery pack with said replacement battery module having a memory effect,
   wherein said replacement battery module has a greater capacity rank than any one of the battery modules within said battery pack prior to providing said replacement battery module with a memory effect,
   wherein said memory effect is provided by a cyclic charge/discharge operation,
   wherein said cyclic charge/discharge operation comprises at least 5 consecutive charge/discharge cycles,
   wherein during said at least 5 consecutive charge/discharge cycles the amount of charge of the replacement battery module is maintained between 20% and 80% of the capacity of the replacement battery module,
   wherein the battery pack is an electric power supply for a vehicle selected from the group consisting of electric vehicles and hybrid vehicles,
   wherein said vehicle has a electronic control unit which monitors the voltage value of at least the replacement battery module and at least one other battery module, and
   wherein the amount of memory effect imparted to the replacement battery module is sufficient to prevent an electric control unit of the battery pack from making a false detection of a voltage dispersion abnormality because of a voltage difference between the voltage value of the replacement battery module and the at least one other battery module.

9. The method of claim 8, wherein the replacement battery module is a Ni-MH secondary cell.

10. The method of claim 8, wherein during said at least 5 consecutive charge/discharge cycles the amount of charge of the replacement battery module is maintained between 40% and 60% of the capacity of the replacement battery module.

11. The method according to claim 8, wherein the cyclic charge/discharge operation is performed to a number of cycles of 5 to 100.

12. The method according to claim 8, wherein the cyclic charge/discharge operation is performed with the charge/discharge rate being set at 2 to 5 C.

13. The method according to claim 8, wherein the cyclic charge/discharge operation is performed with the battery temperature being set at 25-30 degrees Celsius.

14. The method according to claim 8, further comprising overcharging the battery pack to at least 100% of a capacity of the battery pack after replacing one of the secondary cells of the battery pack with the replacement secondary cell.

* * * * *